United States Patent [19]
Kurth

[11] 4,433,422
[45] Feb. 21, 1984

[54] FREQUENCY MEASURING SYSTEM FOR ALTERNATING FREQUENCY SIGNALS

[75] Inventor: Richard R. Kurth, Sudbury, Mass.

[73] Assignee: Sperry Corporation, New York, N.Y.

[21] Appl. No.: 363,196

[22] Filed: Mar. 29, 1982

[51] Int. Cl.³ .......................... H04B 3/46; H04M 1/50
[52] U.S. Cl. ........................................ 375/10; 375/96; 329/104; 364/728
[58] Field of Search ...................... 375/10, 88, 89, 90, 375/91, 96, 78, 80, 82, 15; 364/728, 604; 371/7; 328/140, 141; 329/104

[56] References Cited

U.S. PATENT DOCUMENTS

| | | | |
|---|---|---|---|
| 3,993,956 | 11/1976 | Gilmore et al. | 375/96 |
| 4,007,331 | 2/1977 | Flanagan | 375/82 |
| 4,071,903 | 1/1978 | Head et al. | 364/728 |
| 4,100,499 | 7/1978 | Monrolin | 375/81 |
| 4,164,036 | 8/1979 | Wax | 375/96 |
| 4,330,861 | 5/1982 | Impallomeni et al. | 375/15 |

Primary Examiner—Robert L. Griffin
Assistant Examiner—Stephen Chin
Attorney, Agent, or Firm—Howard P. Terry

[57] ABSTRACT

An apparatus and method for measuring the average or carrier frequency of a frequency shift keyed (FSK) signal which consists of sinusoidal tones that alternate regularly in frequency at a known rate between two unknown frequencies separated by a known frequency shift. The incoming signal is multiplied by two delayed versions of itself to yield to product signals. The delay employed in the first version is nominally equal to the FSK shift rate and the second delay differs from the first by an incremental amount. The two product signals are passed through substantially identical bandpass filters centered at the shift frequency and having a bandwidth approximately equal to the shift rate, and the phase angles of the filtered signals are differentially compared and averaged to produce a signal proportional to the average frequency of the FSK signal.

21 Claims, 3 Drawing Figures

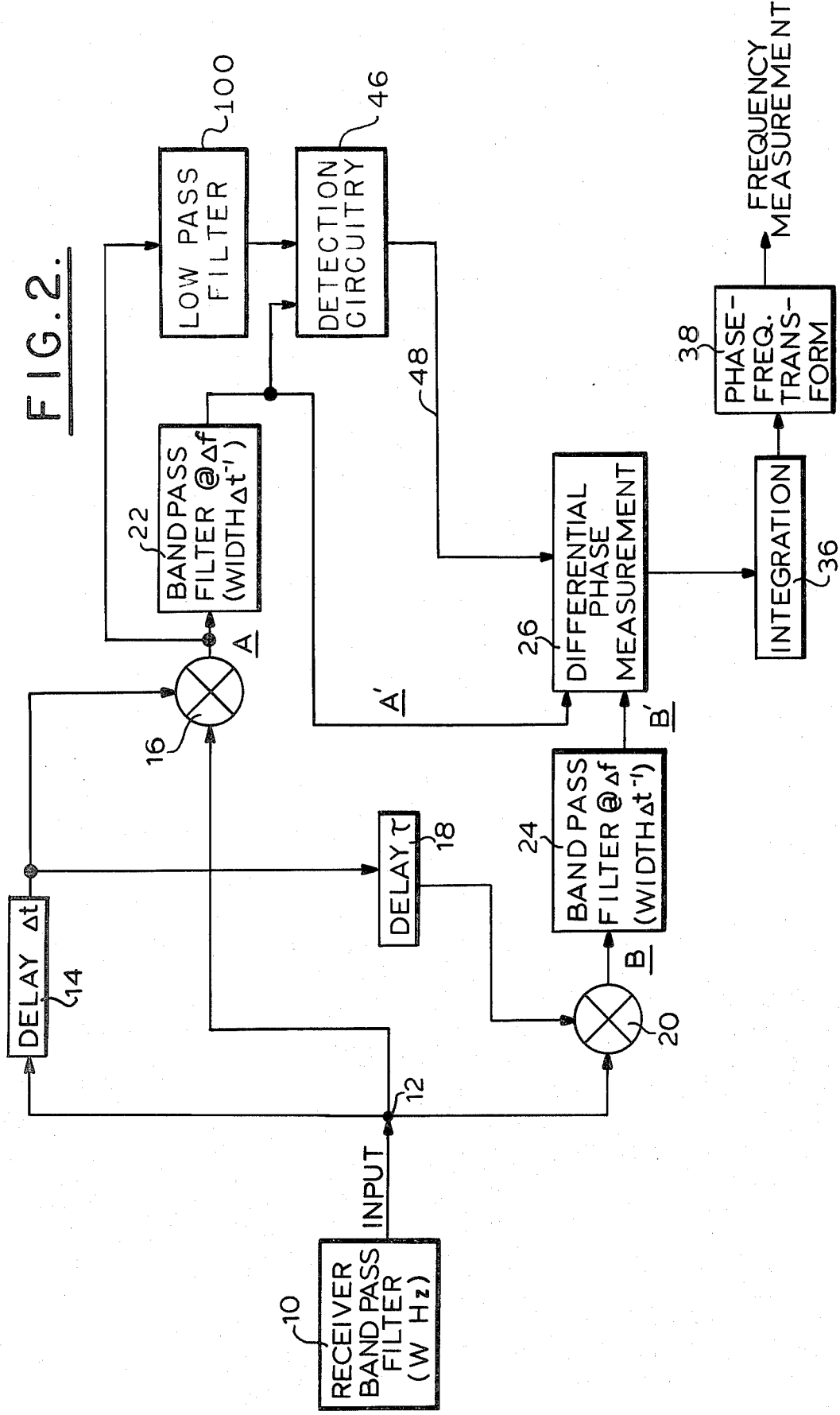

FREQUENCY MEASURING SYSTEM FOR ALTERNATING FREQUENCY SIGNALS

BACKGROUND OF THE INVENTION

1. Field of the Invention

This invention relates to digital communication systems, and in particular to an apparatus and method for measuring the average or center frequency of a frequency shift keyed signal which alternates regularly between two unknown frequencies with a known frequency shift and at a known key rate.

2. Description of the Prior Art

Frequency shift keying (FSK) is one way of conveying binary information in which the carrier switches or alternates between two predetermined frequencies. This may be accomplished for example by either frequency modulating one sine wave oscillator or by switching between two oscillators. In either case the alternating frequencies can be considered as deviating equally above and below an average, center or carrier frequency with a total frequency deviation referred to herein as the frequency shift or shift frequency.

Frequency shift keyed communication signals may be used in communication systems to alert the start or end of a transmission or some special event during a transmission, to synchronize remote equipment, or to transmit data. Under these circumstances detection of the onset of such an FSK signal, either by a communications receiver or by an intercept receiver, is a necessary system function.

In some situations, the transmission carrier frequency of the FSK signal may not be known at the receiver due to doppler shift, for example, or due to drift or wandering of the carrier frequency at the transmitter or due to lack of transmitter and receiver coordination. Unknown carrier frequency makes the onset detection of these signals more difficult. Furthermore, it may be necessary to determine the transmission carrier frequency for other system functions such as synchronization or demodulation, or in the case of a non-cooperative transmitter, for intercepting subsequent transmissions or for directing jamming signals.

Effective methods and apparatus for detecting the onset of such FSK signals are described in U.S. patent application, Ser. No. 340,741 entitled "Apparatus and Method for Detecting the Onset of a Frequency Shift Keyed Signal", filed by C. L. Bennett and R. L. Price on Jan. 20, 1982, and in U.S. patent application, Ser. No. 352,677 entitled "Improved Apparatus and Method for Detecting the Onset of a Frequency Shift Keyed Signal", filed by Richard R. Kurth on Feb. 26, 1982. Both applications are assigned to Sperry Corporation. One advantage of these inventions, as disclosed in the applications therefore, is that the onset detection scheme does not require knowledge of the FSK carrier frequency or of the time instance at which the frequency shifts occur. Only the amount of the frequency shift and its shift rate or key rate are required for the detection scheme. Those inventions also discriminate against other modulated or unmodulated tonal signals with properties different from the alternating FSK waveform, such as a pair of continuous wave (CW) signals separated in frequency by an amount equal to the FSK shift frequency. As a consequence of their operating principals, these detectors do not provide an estimate of average, center, or carrier frequency of the detected FSK signal. Thus it would be desirable to provide a frequency measuring system that is compatible with the onset detection schemes described in the referenced patent applications. To be fully compatible therewith the frequency measuring system should be capable of measuring the average frequency of the alternating FSK waveform when it is present as one signal among other interfering signals and noise, with a priori knowledge of only the FSK shift frequency and shift rate or key rate.

Several approaches are possible for measuring the average frequency of an alternating FSK signal whose onset has been detected by onset detectors such as described in the referenced patent applications, or by other means. First, a simple frequency discriminator in parallel with the detector could be used to measure frequency. However, the presence of any other tonal signals in the frequency band of observation could produce erroneous frequency estimates with this approach.

A second approach to alternating FSK signal frequency measurement is spectral analysis, accomplished, for example, by passing the input signal through a bank of narrow bandpass filters covering the input frequency band. The presence of signal energy in a particular filter output in excess of that in neighboring filter outputs signifies a tonal signal and thereby localizes it in frequency to that particular filter's pass band. If the spectral analysis frequency resolution (analysis filter bandwidth) is insufficient to resolve the individual FSK tone frequencies, it is difficult to determine reliably which frequency among the multiple frequencies revealed by the spectral analysis, corresponds to the detected alternating FSK waveform. If the analysis bandwidth is narrow enough to resolve the individual FSK tone, the presence of twin spectral components separated by the FSK shift frequency potentially identifies the frequency location of the alternating FSK signal. However, spectral analysis with this degree of resolution involves substantial signal processing and still does not permit easy discrimination against two unmodulated tones with a frequency difference equal to the FSK shift frequency.

A third approach is to filter the input signal with a bank of frequency contiguous bandpass filters of bandwidth not less than the FSK shift frequency, and to process the output of each filter with an alternating FSK detector of the type described in the referenced applications, for example. This approach provides simultaneous detection of the alternating FSK signal and an estimate of its frequency by virtue of the narrow frequency band in which detection occurs. The individual alternating FSK detectors provide the necessary discrimination against other tonal signals with different characteristics. However, this approach is complex, requiring parallel channels each with a filter and detector. A variant of this approach with fewer parallel channels involves several sequential stages of filter banks and detectors with increasing frequency resolution. However, this approach has the disadvantage of introducing a delay into the frequency measurement process and requires more control circuitry.

SUMMARY OF THE INVENTION

The present invention embraces a method and apparatus for measuring the average, center, or carrier frequency of a frequency shift keyed signal which alternates regularly between two frequencies with a prescribed shift frequency and at a prescribed shift rate or key rate. The invention when used in conjunction with FSK onset detection systems will perform such measurement when there are tonal signals with different characterstics present in the input, such as a pair of continuous wave signals separated by the shift frequency. The invention has a structure that is economical to implement and does not involve separation of the input signal into many parallel narrowband channels. The invention comprises delaying the incoming signal by a first time interval substantially equal to an odd multiple of the key rate, and then multiplying this delayed signal by the incoming signal to produce a first product. The incoming signal is also delayed by a second time interval which differs from the first time interval by a preselected increment, and this second delayed signal is then multiplied by the incoming signal to produce, a second product. Both product signals comprising sum and difference components, are filtered through bandpass filters centered at substantially the shift frequency with a bandwidth substantially equal to the key rate. The filtration has the effect of extracting the difference components of the respective product signals while rejecting the sum components thereof. The difference components are then compared on the basis of phase and a signal is produced to represent the phase difference between the components. The phase different signal is integrated, preferably for the duration of the FSK signal, and scaled to produce a frequency estimate from the measured phase difference.

BRIEF DESCRIPTION OF THE DRAWINGS

FIG. 2 is a block schematic diagram of the preferred embodiment of the invention.

DESCRIPTION OF THE PREFERRED EMBODIMENT

Figure 1:
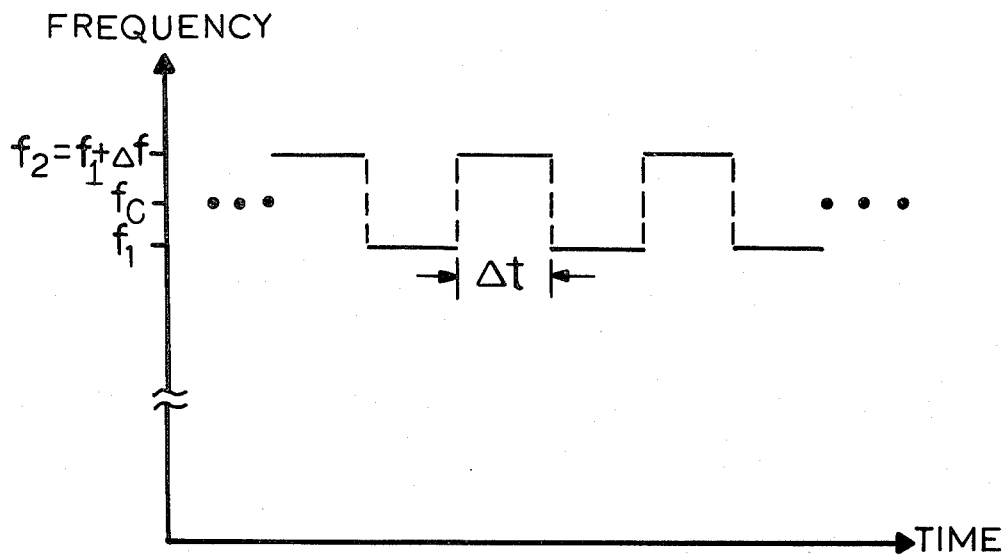
FIG. 1 shows a frequency vs time history of typical frequency shift keyed (FSK) waveform whose center or average frequency might be measured by the invention.

The present invention is particularly adapted to measure the average or carrier frequency of a frequency shift keyed (FSK) signal. FIG. 1 shows a frequency vs time history of an FSK signal in which frequency is plotted along the abscissa and time along the ordinate. The signal alternates between a first frequency $f_1$ and a second frequency $f_2$ during regular shift intervals $\Delta t$ at a rate hereinafter referred to as the key rate or shift rate, $1/\Delta t$. The frequency $f_2$ may be considered as the sum of a frequency of $f_1$ plus a shift frequency $\Delta f$, ie., $\Delta f = f_2 - f_1$. This shift frequency is also referred to herein as the frequency shift. The average frquency of this signal is designated as $f_c = f_1 + \Delta f/2$. It may be the carrier frequency of the FSK transmission or an intermediate frequency derived by frequency translation of the received signal or incoming signal, through heterodyning for example.

The presently preferred embodiment of the invention is shown in FIG. 2. The embodiment is designed to measure the average frequency $f_c$ of an incoming FSK waveform when it is present as one signal among interfering signals and noise in an input passband of width W Hz. The incoming signal may be prefiltered through a receiver bandpass filter 10 having a passband width of W Hz to eliminate those frequencies known not to contain the desired FSK signal. In this manner the effects of extraneous signals, interference, or noise may be suppressed. Since the average frequency $f_c$ is unknown, except that it falls within the bandwidth W, the bandwidth W is typically considerably greater than the frequency shift $\Delta f$. The incoming signal from bandpass filter 10 is applied through an input port 12 to a first time delay device 14 which is adapted to delay the incoming signal by an odd multiple of the key period $\Delta t$. The time delay device 14 may be, for instance, an analog delay device, or a shift register interfaced with an A/D converter in the usual fashion. In some applications, especially at very high key rates, a surface acoustic wave (SAW) delay line may be used. In the presently preferred embodiment the incoming signal is delayed in delay device 14 by approximately the unity multiple of the key period $\Delta t$. The output of the first time delay device 14 and the incoming signal from input port 12 are multiplied together in a first multiplier 16 to produce a first product. The output of delay device 14 is also applied to a second delay device 18 which is adapted to produce an additional incremental delay of $\tau$ seconds. The precise value of $\tau$ depends on the details of the phase measurements circuitry as will be explained. The output of the second time delay device 18 is multiplied with the incoming signal from input port 12 in a second multiplier 20 to produce a second product. It will be recognized that the output of second delay device 18 differs from the output device 14 by the incremental delay $\tau$. Other embodiments are possible to effect this result. For instance, instead of using delay device 14 as a common element to provide the principal delay $\Delta t$ for both multipliers, a pair of delay lines could be substituted therefore. In such an arrangement the parallel legs of the delay lines could be constructed such that one delay differs from the other by plus or minus $\tau$. The first and second product signals, obtained from multipliers 16 and 20 respectively, are passed through identical bandpass filters 22 and 24 respectively. The bandpass filters 22 and 24 are centered at substantially the shift frequency $\Delta f$ and have a bandwidth approximately equal to the key rate or shift $1/\Delta t$. The outputs of the bandpass filters are applied to a differential phase measuring circuit 26 which measures the phase angle between the applied signals.

Figure 3:
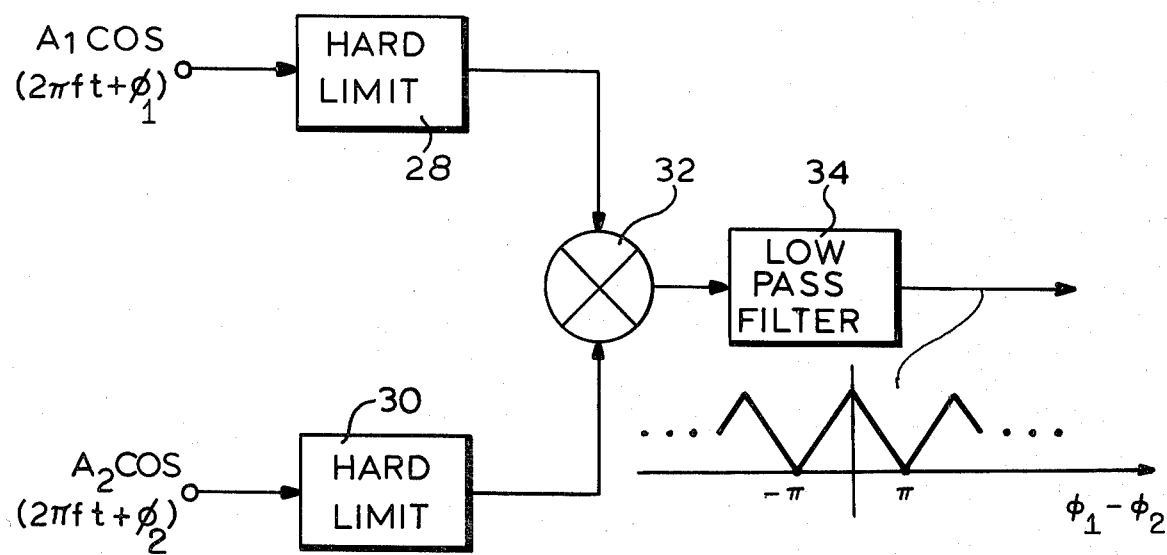
FIG. 3 is a schematic block diagram of a differential phase measurement scheme which may be employed in the present invention.

The differential phase measurement circuit 26 may be of the type shown in FIG. 3 which is well known to those skilled in the art. Referring to FIG. 3, the phase measurement circuit comprises a pair of hard limiter circuits 28 and 30 which are receptive of the respective outputs of bandpass filters 22 and 24. The hard limiter circuits amplify and clip the applied input waveforms to produce square waves independent of input amplitude. The outputs are applied to a multiplier 32 whose output is a rectangular waveform with variable duty cycle dependent upon the phase angle between the inputs from limiters 28 and 30. Thus the average (DC) value of the output of multiplier 32 is proportional to the phase angle between the applied signals from bandpass filters 22 and 24 respectively. A low pass filter 34 extracts the DC component to produce a phase angle signal representing the difference between the applied signals. It will be appreciated that other phase measurement circuits are possible, including digital circuits. Whatever circuit is employed should produce phase measurements with a time constant or measuring interval on the order of the FSK tone duration $\Delta t$.

Returning to FIG. 2, the output of phase measurement circuitry 26 is applied to an integrator 36 which serves to average the phase measurement over multiple alternation periods and thereby improve measurement accuracy. The output of integrator 36 is applied to a phase-frequency transforming circuit 38. The transforming circuit derives a frequency estimae from the measured phase by compensating for the phase detector characteristics and scaling, if necessary. It will be appreciated that the phase measurement, integration, and transformation operations may be implemented in a more integral fashion, such as with digital techniques for example.

When used in conjunction with an FSK onset detection system utilizing time delay techniques, such as the systems described in the referenced U.S. Pat. application Ser. No. 340,741, entitled "Apparatus and Method for Detecting the Onset of a Frequency shift Keyed Signal", filed by C. L. Bennett, and R. L. Price on Jan. 20, 1982, and in U.S. Pat. application Ser. No. 352,677 entitled "Improved Apparatus and Method for Detecting the Onset of a Frequency Shift Keyed Signal", filed by Richard R. Kurth on Feb. 26, 1982, some components used in the frequency measurement system may be shared for the purpose of detecting the onset of the alternating FSK signal. This onset detection circuitry, although not required to practice the invention, is shown in FIG. 2 and designated by reference numeral 46.

The onset detection circuitry may include, for example, means for disabling the phase measurement circuit 26 when two continuous wave (CW) tones, $\Delta f$ apart, are present in the incoming signal. The means for disabling the phase measurement circuit may be implemented using a low pass filter to sense the presence of two CW tones. The low pass filter may comprise part of the detection circuitry 46, or it may be a separate filter 100 for connection to the output of either multiplier 16 or multiplier 20. The output of low pass filter 100 may be used to disable circuit 26 if the filter 100 output is high and the output levels of bandpass filter 22 or 24 are also high. It will be appreciated that the detection scheme, as described more fully in the previously referenced patent applications, utilizes the difference component resulting from the product of the incoming signal with a delayed version of itself. While the detection circuitry 46 is shown in FIG. 2 as receiving this difference signal from bandpass filter 22, the difference signal may be alternatively derived from bandpass filter 24. A signal path on lead 48 is provided for the purpose of enabling or initiating the frequency measurement upon detection of the FSK signal. In practice, the signals from the output of bandpass filters 22 and 24 may exhibit phase jumps and amplitude transients every $\Delta t$ seconds, depending on the characteristics of the FSK transmissions and the circuit details. If these occur, signals may be derived from the detection circuitry 46 to indicate their presence and protect the differential phase measurement circuit 26 by momentarily disabling it, for example. Alternatively, transients induced in the phase measurements may be smoothed by filtering as a part of the phase measurement integration, for example.

To demonstrate the operating principles of the invention consider an incoming FSK signal with a frequency vs time history of the type shown in FIG. 1 which is confined to an input signal bandwidth W. The incoming FSK signal may be accompanied by other unwanted signals and noise, which might include a pair of continuous wave (CW) signals separated in frequency by an amount equal to the shift frequency $\Delta f$. This pair of CW signals is particularly troublesome to frequency measuring systems utilizing multiple parallel narrow band channels found in the prior art. The present invention, however, will perform FSK frequency measurements even when there are tonal signals with different characteristics also present in the input when disablement means are provided as discussed.

The incoming signal is applied through receiver bandpass filter 10 which serves to reject unwanted signals outside the signal bandwidth W. The incoming signal is then applied to the first time delay device 14 which time delays the waveform by a period substantially equal to $\Delta t$. The shifted waveform is multiplied by the incoming waveform in multiplier 16 to produce sum and difference frequencies. In this regard, recall the trigonometric identity $(\cos f_1)(\cos f_2) = \frac{1}{2}\cos(f_2-f_1) + \frac{1}{2}\cos(f_2+f_1)$. It will be recognized that the difference component $(f_2-f_1)$ is, in fact, the shift frequency $\Delta f$. Similarly, the incoming waveform is delayed by the combined actions of first delay device 14 and second delay device 18 to provide a total delay of $\Delta t + \tau$. The second delay signal is multiplied by the incoming signal in multiplier 20 to produce a second product having corresponding sum and difference components.

The first and second product signals are then filtered through the respective bandpass filters 22 and 24 which are centered at the shift frequency $\Delta f$ and have a bandwidth approximately equal to the shift rate $1/\Delta t$. The bandpass filters 22 and 24 pass the $\Delta f$ sinusoidal component (difference component) and attenuate other undesirable signal components. As a consequence of the time delay and multiplier operations the inputs to bandpass filters 22 and 24 contain sinusoidal components at the difference frequency $\Delta f$. These components have a steady frequency and possible phase discontinuity every $\Delta t$ seconds. However, there is a differential phase angle between these $\Delta f$ components which is induced by the differential delay $\tau$ in the multiplier inputs. This magnitude of this differential phase is fixed over intervals of $\Delta t$ and alternates regularly between $2\pi f \tau$ and $-2\pi(f+\Delta f)\tau$ radians in synchronism with the input FSK signal. The bandpass filters 22 and 24 pass the $\Delta f$ sinusoidal components while preserving the differential phase angle. Since the phase difference is proportional to the frequencies f and $f+\Delta f$ in an alternating fashion, integration in integrator 36 and correction for the proportionality in phase-frequency transformation circuit 38 provides the average frequency measurement.

Should a pair of CW signals, separated in frequency by $\Delta f$, be present in the incoming signal and within the input bandwidth, use of the disablement means discussed above is preferred. In this case the sum of two CW signals, $f_a$ and $f_a + \Delta f$, applied to the inputs of multipliers 16 and 24 will yield signal terms at frequencies of $2f_a$, $2(f_a + \Delta f)$, $\Delta f$, 0 or dc, and $2f_a + \Delta f$. Thus it will be appreciated that the frequency measuring circuitry must be disabled, by detection circuitry 46 operating in conjunction with low pass filter 100. The low pass filter 100 would have a cut off sufficiently below the non dc signal terms so that it would essentially detect the 0 or dc term. The presence of this dc term simultaneously with the $\Delta f$ term might be used to trigger the disablement of frequency measuring circuitry so as to avoid a false indication.

For proper frequency measurement the differential delay 18 must be small enough to restrict differential phase variations for signals occuring anywhere in the input bandwidth W to an unambiguous range. For example, a value of τ not exceeding 1/(2 W) limits the variation to π radians. The precise value of τ selected depends on the details of the phase measurement circuitry. For the phase measurement circuit shown in FIG. 3, a value of differential delay τ on the order of 1/(2 W) and providing a 90° phase shift at the midpoint of the input band permits an unambiguous frequency measurement.

The purpose of the differential delay τ in the frequency measurement system is to derive a pair of signal components at frequency Δf arising from the alternating FSK signal, and which have a phase shift proportional to the instantaneous frequency of the incoming FSK signal. It will be appreciated that any other circuit element which produces an unambiguous phase shift as a function of frequency over the bandwidth is consistent with the principles of this invention. In this case the circuit element, which may be a non-linear device for example, should have a phase versus frequency characteristic which is known with sufficient precision to permit accurate transformation of phase measurements to frequency estimates. Also, the differential delay τ may be placed in any one of the multiplier input branches shown in FIG. 2 to introduce the proper differential phase.

While the invention has been described in its preferred embodiments, it is to be understood that the words that have been used are words of description rather than words of limitation and that changes within the purview of the appended claims may be made without departing from the true scope and spirit of the invention in its broader aspects.

I claim:

1. A method of measuring the center frequency of an incoming frequency shift keyed signal having known shift frequency, known key rate, and known key period comprising
   a. delaying the incoming signal by a first time interval to produce a first delayed signal,
   b. multiplying the first delayed signal by incoming signal to produce a first product signal having sum and difference components,
   c. filtering the first product signal to pass the difference component thereof while rejecting the sum component thereof,
   d. delaying the incoming signal by a second time interval, not equal to said first time interval, to produce a second delayed signal,
   e. multiplying the second delayed signal by the incoming signal to produce a second product signal having sum and difference components,
   f. filtering the second product signal to pass the difference component thereof while rejecting the sum component thereof,
   g. multiplying the difference component of the first product signal with the difference component of the second product signal to produce a third product having phase sum and phase difference components,
   h. filtering the third product to pass the phase difference component and to reject the phase sum thereby producing a phase angle signal representing the phase difference between the difference component of the first product signal and the difference component of the second product signal,
   i. transforming the phase angle signal into a frequency signal.

2. The method of claim 1 wherein the step of delaying the incoming signal by a second time interval comprises delaying the first delayed signal by a third time interval to produce said second delayed signal.

3. The method of claim 1 wherein said first time interval is substantially equal to an odd multiple of the key period.

4. The method of measuring the center frequency of an incoming frequency shift keyed signal within a specified band of frequencies according to claim 1 further comprising selecting said second time interval such that for every frequency within said band of frequencies there is a corresponding unique phase angle signal.

5. The method of measuring the center frequency of an incoming frequency shift keyed signal within a specified band of frequencies according to claim 2 further comprising selecting said third time interval such that for every frequency within said band of said frequencies there corresponds a unique phase angle signal.

6. The method of claim 1 wherein the step of filtering the first product signal comprises filtering a first product through a bandpass filter having a passband centered at substantially the shift frequency and having a bandwidth substantially equal to the key rate.

7. The method of claim 1 wherein the step of filtering the second product signal comprises filtering the second product through a bandpass filter having a passband centered at substantially the shift frequency and having a bandwidth substantially equal to the key rate.

8. The method of claim 1 comprising the additional step of integrating the phase angle signal.

9. The method of claim 1 wherein the difference components multiplying step includes hard limiting the first and second product signals.

10. An apparatus for measuring the center frequency of an incoming frequency shift key signal having known shift frequency, known key rate, and known key period comprising means for delaying the incoming signal by a first time interval producting a first delayed signal, means for multiplying the first delayed signal by the incoming signal producing a first product signal having sum and difference components, means for filtering the first product signal to pass the difference component thereof while rejecting the sum component thereof, means for delaying the incoming signal by second time interval not equal to said first time interval to produce a second delayed signal, means for multiplying the second delayed signal by the incoming signal to produce a second product signal having sum and difference components, mean for filtering the second product signal to pass the difference component thereof while rejecting the sum component thereof, means for multiplying the difference component of the first product signal with the difference component of the second product signal to produce a third product signal having phase sum and phase difference component, means for filtering said third product to pass said phase difference component and to reject said phase sum component, thereby producing a phase angle signal representing the phase difference between the difference component of said first product signal and the difference component of said second product signal, and means for transforming said phase angle signal into a frequency signal.

11. The apparatus of claim 10 wherein said means for delaying the incoming signal by a second time interval comprises means for delaying said first delayed signal by a third time interval to produce said second delay signal.

12. The apparatus of claim 10 wherein said first time interval is substantially equal to an odd multiple of the key period.

13. An apparatus for measuring the center frequency of an incoming frequency shift signal within a specified band of frequencies according to claim 10 wherein said second time interval is selected such that for every frequency within said band of frequencies there is a corresponding unique phase angle signal.

14. An apparatus for measuring the center frequency of an incoming frequency shift key signal within a specified band of frequencies according to claim 11 wherein said third time interval is selected such that for every frequency within said band of frequencies there corresponds a unique phase angle signal.

15. The apparatus of claim 10 wherein said means for filtering the first product signal comprises bandpass filter means having a pass band centered at substantially the shift frequency and having a bandwidth substantially equally to the key rate.

16. The apparatus of claim 10 wherein said means for filtering the second product signal comprises bandpass filter means having a pass band centered at substantially the shift frequency and having a bandwidth substantially equally to the key rate.

17. The apparatus of claim 10 further comprising means for integrating said phase angle signal.

18. The apparatus of claim 10 wherein the difference components multiplying means includes means for hard limiting the first and second product signals.

19. The method of measuring the center frequency of an incoming frequency shift keyed signal in the intermittent presence of an incoming pair of continuous wave signals separated in frequency by the shift frequency of said incoming frequency shift keyed signal according to claim 1 further comprising detecting the presence of said incoming pair of continuous wave signals and ceasing to produce said phase angle signal during times when said incoming pair of continuous wave signals are present.

20. The apparatus for measuring the center frequency of an incoming frequency shift keyed signal in the intermittent presence of an incoming pair of continuous wave signals separated in frequency by the shift frequency of said incoming frequency shift keyed signal according to claim 10 further comprising
 means for detecting the presence of said incoming pair of continuous wave signals,
 and means responsive to said means for detecting the presence of said incoming pair for disabling said phase comparing means during times when said incoming pair of continuous wave signals are present.

21. The apparatus according to claim 20 wherein said means for detecting the presence of said incoming pair of continuous wave signals comprises lowpass filter means.

* * * * *